Sept. 27, 1966 J. B. M. SPAAPEN ETAL 3,275,539

METHOD OF MANUFACTURING SEMI-CONDUCTOR DEVICES

Filed Nov. 9, 1962 3 Sheets-Sheet 1

INVENTOR
JOSEPH B.M. SPAAPEN
A. C. J. VERHOEVEN
BY
AGENT

INVENTOR
JOSEPH B.M. SPAAPEN
A.C. J. VERHOEVEN
BY
[signature]
AGENT

METHOD OF MANUFACTURING SEMI-CONDUCTOR DEVICES

Filed Nov. 9, 1962 3 Sheets-Sheet 3

INVENTOR
JOSEPH B.M. SPAAPEN
A.C.J. VERHOEVEN
BY
Frank R. Jifari
AGENT 3,275,539

METHOD OF MANUFACTURING SEMI-CONDUCTOR DEVICES

Joseph Bernardus Marie Spaapen, Mollenhutseweg, Nijmegen, and Adrianus Cornelis Johannes Verhoeven, Eindhoven, Netherlands, assignors to North American Philips Company, Inc., New York, N.Y., a corporation of Delaware Filed Nov. 9, 1962, Ser. No. 236,571
5 Claims. (Cl. 204—143)

This invention relates to a method of manufacturing a semi-conductor device, for example a transistor, in which a quantity of a masking agent is applied to a surface of a semi-conductor body between two electrodes disposed adjacent each other on the said surface, whereupon the free surface around these electrodes is subjected to an etching treatment.

It is known to apply the quantity of masking agent between the electrodes by dipping the semi-conductor body with the electrodes in a masking agent, for example lacquer; the lacquer is then allowed to dry and finally the body is cleaned by spraying with the aid of a solvent for the lacquer in a manner such that this lacquer is left only on the surface part of the body lying between the electrodes. Consequently, at least two operations are required, namely the dipping and the cleaning by spraying. The latter operation should be effected with accuracy. This is described in a copending United States application, Serial No. 786,421, filed January 12, 1959, now Patent No. 3,072,514.

The invention has for its object inter alia to provide a simpler method to attain the same end. It is based on the recognition of the fact that electric current supply members which are provided on the electrodes sometimes after, but mostly prior to the application of the masking agent, may be used in the last-mentioned case for guiding the masking agent.

According to the invention, two current supply members are provided adjacent each other on the electrodes, subsequent to which a quantity of a masking agent is applied between these members so that it flows along these members to the electrodes and covers the surface part of the semiconductor body lying between these electrodes.

Preferably, the sides of the current supply members facing each other converge towards the electrodes. These sides may also be parallel to each other.

The invention will now be described more fully, by way of example, with reference to the accompanying drawing.

All figures are drawn on an enlarged scale.

Figure 1:
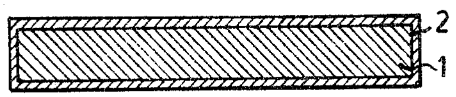
FIGS. 1 to 3 show diagrammatically and in sectional view three stages of the manufacture of a semi-conductor body comprising two adjacent electrodes.
Figure 2:
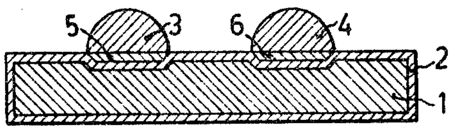
Figure 3:
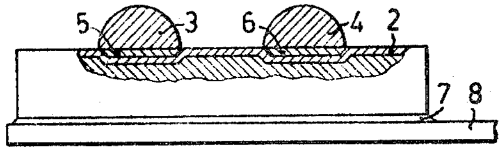

The starting material in all examples is a body 1 consisting of p-type germanium having a resistivity of 1 ohm-cm., which body is converted by diffusion of antimony over a surface part 2 to a depth of 5 microns into the n-type (FIG. 1) and to which two electrodes 3 and 4 are subsequently alloyed. The alloyed material of the first electrode 3 consists of an alloy of lead containing 2% by weight of antimony, the electrode 4 being obtained by alloying of the same material which moreover contains approximately 10% of aluminum. The alloying process is effected, for example, at a temperature of 780° C. for 3 minutes. After cooling, a segregated n-type layer 5 is formed under the electrode 3, as a result of which the electrode 3 establishes an ohmic contact with the layer 2, while under the electrode 4, an aluminum-containing segregated layer 6 is formed which establishes a rectifying contact with the layer 2 (FIG. 2). Subsequently, the bottom face of the body 1 is removed by etching and the body is secured to a nickel support 8 by means of an indium layer 7 (FIG. 3).

The length and the width of the body 1 are, for example, 3 mms., while the thickness amounts to 100 microns. The width of the part of the body covered by the electrodes 3 and 4 is, for example, for both electrodes 100 microns, while the free part between these electrodes may have a width of 80 microns.

The composition of this starting material is not essential for the invention, but it is of importance that the surface part of the body 1 surrounding the electrodes 3 and 4, except the part lying between these electrodes, is removed by etching.

Figure 4:
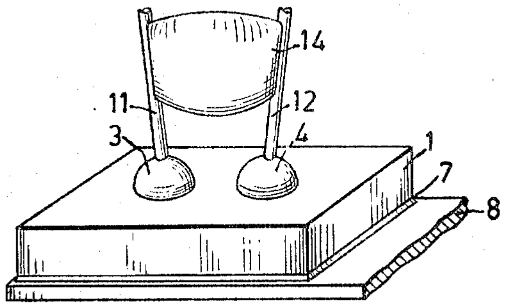
FIGS. 4 to 7 show diagrammatically and in perspective view the method of applying the masking agent.
Figure 5:
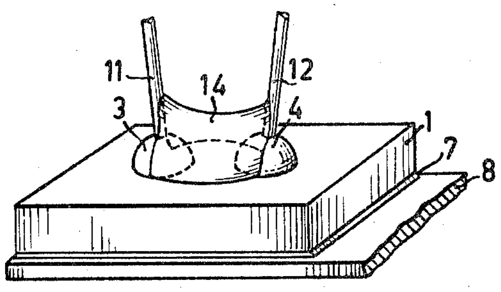

To this end, two adjacent current supply members 11 and 12 consisting of nickel are soldered to the electrodes 3 and 4, as shown in FIGS. 4 and 5. In this case, the members are shaped in the form of wires which slightly diverge in the upward direction. A drop 14 consisting of a solution of nitrocellulose in amyl acetate (for instance about 200 grams of nitrocellulose in 1 liter of amyl acetate), to serve as a masking agent, is applied between these wires by means of a needle. Under the influence of gravity and/or by the action of the surface tension of the liquid between the wires, this drop 14 moves towards the electrodes 3 and 4 until it covers the surface part of the body 1 between the electrodes, see FIG. 5. Here, the masking agent is allowed to dry.

The masking agent may be any substance which is not attacked by the etching liquid to be used and which may form liquid drops which drops under the action of gravity and/or by the action of surface tension of the liquid, and thus can move along wires when applied between the wires. Moreover the masking liquid must wet the semi-conductor surface and after some time due to drying and/or cooling get into the solid state. Many known masking agents such as wax and nitrocellulose varnishes will do. For instance, for the purpose described, a nitrocellulose varnish having the following (relative) composition also will do very well.

| | |
|---|---|
| Toluene, l. | 160 |
| Aethylacetate (95%), l. | 90 |
| Butylacetate (98–100%), l. | 35 |
| Methylisobutylketon, l. | 35 |
| Butanol (98%), l. | 12 |
| Diacetonalcohol, l. | 10 |
| Ispropanol, l. | 15 |
| Dioctylphthalate, l. | 35 |
| Nitrocellulose, kg. | 71.5 |
| Maleinateresin, kg. | 30 |

Figure 6:
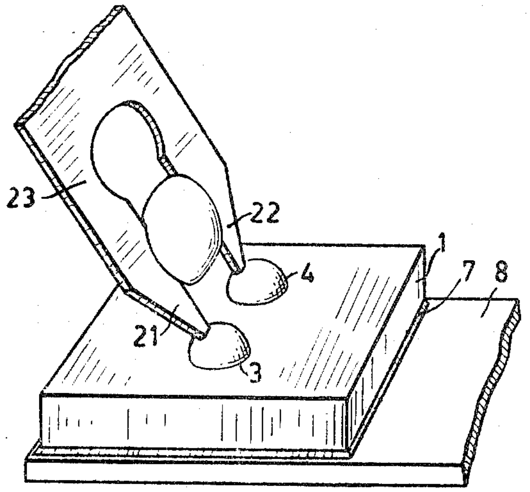

In the variant shown in FIG. 6 the current supply members consists of two limbs 21 and 22 of a fork plate 23; the drop 24 is applied in the same manner as in the device shown in FIGS. 4 and 5.

Figure 7:
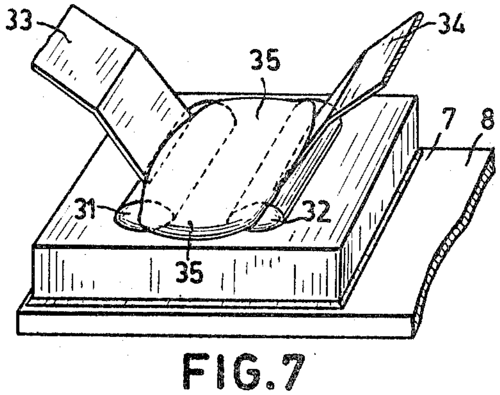

In the variant shown in FIG. 7, the electrodes 31 and 32 are strip-shaped; the current supply members consist of nickel strips 33 and 34 having a width of 500 microns and a thickness of 50 microns. In this case, the masking agent is applied to the sides of these strips facing each other, or if desired, only to one of these sides, whereupon it flows off onto the surface part of the body 1 between the electrodes 31 and 32 where it is dried. The dried layer is indicated by 35.

Figure 8:
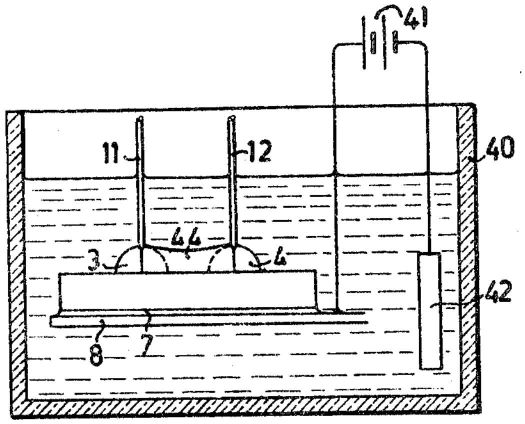
FIG. 8 shows a device for removing part of a semi-conductive surface by means of electrolytic etching.
Figure 9:
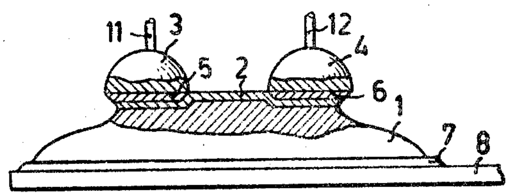
FIGS. 9 and 10 are sectional views of two finished transistors.

Subsequently, a device manufactured in this manner is introduced into a bath 40 consisting of a 30% solution of potassium hydroxide in water, see FIG. 8, the positive terminal of a current source 41 being connected to the support 8. The negative terminal of this current source is connected to a cathode 42 disposed in the bath. The surface of the body 1 coming into contact with the bath is now dissolved at least throughout the depth of penetration of the n-type diffusion layer 2. The part between the electrodes 3 and 4 is protected by a masking layer 44 formed by the dried masking agent while the electrodes 3 and 4 protect the underlying semi-conductor from action by the etching solution. Finally, the masking layer 44 is removed by means of acetone. The ultimate result is shown in FIG. 9.

Figure 10:
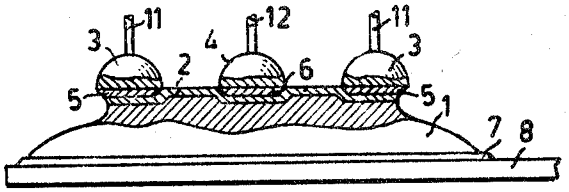

Though the above example relates to an alloy-diffusion transistor comprising a base electrode 3 and an emitter electrode 4 disposed adjacent each other, and the invention is particularly suitable for use in the manufacture of such transistors, it is evident that it may also be used in other semi-conductor devices in which a semi-conductive surface between two electrodes is to be provided with a masking layer. Furthermore it should be noted that the invention is also applicable to a semi-conductor device in which three or more electrodes are disposed adjacent each other. An embodiment of such a device is shown in FIG. 10. This device, which is also an alloy-diffusion transistor, is distinguished from the device shown in FIG. 9 only in that two base electrodes 3 are present. In the manufacture of these two transistors, there is also only the difference that with the transistor shown in FIG. 10, a quantity of masking agent is applied twice.

What is claimed is:

1. In the manufacture of a semi-conductor device comprising a semi-conductive body having two closely-spaced adjacent electrode portions on the same surface of the body, the method of selectively removing surface portions of the body leaving intact the surface portions intervening between the electrodes, comprising the steps of connecting a current-supply lead to each of the electrodes, depositing between the current-supply leads and on at least one of the current-supply leads at a point spaced from the body a drop of flowable masking agent such that it adheres to and flows along the said at least one lead, directed by said lead, toward the body, said current-supply leads being so closely spaced that, by virtue of surface tension forces, the drop accumulates between the leads to deposit on and cover substantially only that portion of the surface of the body extending between the leads, and thereafter subjecting exposed surface portions of the body to a body-material-removing etching treatment while the masking agent remains in position protecting the body surface portions between the electrodes from contact with the etchant.

2. The method set forth in claim 1 wherein the leads extend upwardly from the surface and diverge outwardly from the surface, and the flowable agent is deposited in contact with both leads.

3. The method of claim 1 wherein the masking agent is a hardenable drop of liquid material unreactive to the etchant and capable of wetting the semi-conductive body and leads.

4. The method of claim 3 wherein the masking agent is a soluble lacquer.

5. The method of claim 1 wherein the electrodes are alloyed pellets which protrude from the body surface.

References Cited by the Examiner

UNITED STATES PATENTS

| | | | |
|---|---|---|---|
| 2,813,782 | 11/1957 | Spanos ---------- | 156—17 XR |
| 2,846,340 | 8/1958 | Jenny. | |
| 3,072,514 | 1/1963 | Jochems et al. | |
| 3,140,527 | 5/1964 | Valdman et al. | |

FOREIGN PATENTS

| | | |
|---|---|---|
| 836,595 | 6/1960 | Great Britain. |

JOHN H. MACK, *Primary Examiner.*

R. K. MIHALEK, *Examiner.*